(12) United States Patent
Engelbrecht et al.

(10) Patent No.: US 11,148,158 B2
(45) Date of Patent: Oct. 19, 2021

(54) AGRICULTURAL SPRAYER WITH COMPRESSED AIR SPRAY

(71) Applicant: Deere & Company, Moline, IL (US)

(72) Inventors: Joshua J. Engelbrecht, Ankeny, IA (US); Pierre van Raaij, Venray (NL); Julien Saint Laurent, Weinheim (DE)

(73) Assignee: DEERE & COMPANY, Moline, IL (US)

( * ) Notice: Subject to any disclaimer, the term of this patent is extended or adjusted under 35 U.S.C. 154(b) by 85 days.

(21) Appl. No.: 15/962,533

(22) Filed: Apr. 25, 2018

(65) Prior Publication Data

US 2018/0369851 A1 Dec. 27, 2018

Related U.S. Application Data

(60) Provisional application No. 62/524,417, filed on Jun. 23, 2017.

(51) Int. Cl.
  *B05B 15/55* (2018.01)
  *A01C 23/04* (2006.01)
  (Continued)

(52) U.S. Cl.
  CPC ............ *B05B 15/55* (2018.02); *A01C 23/047* (2013.01); *A01M 7/005* (2013.01);
  (Continued)

(58) Field of Classification Search
  CPC ........... B05B 15/55; B05B 15/58; B05B 1/20; A01C 23/047; A01M 7/0042; A01M 7/005; A01M 7/0089
  (Continued)

(56) References Cited

U.S. PATENT DOCUMENTS

| 4,196,852 A | * | 4/1980 | Thomas, III | ........ A01M 7/0089 239/113 |
| 4,467,961 A | * | 8/1984 | Coffee | ................ A01M 7/0089 239/1 |

(Continued)

FOREIGN PATENT DOCUMENTS

NL        1018030 C2     6/2002

OTHER PUBLICATIONS

European Search Report for application No. 18177492.8 dated Sep. 25, 2018.

(Continued)

*Primary Examiner* — Joseph A Greenlund
(74) *Attorney, Agent, or Firm* — Klintworth & Rozenblat IP LLP (57) ABSTRACT

An agricultural sprayer system includes a solution circuit including solution lines and a fluid pump to pump a solution from the solution tank through the solution lines to the spray nozzles; an air circuit including air lines and a source of compressed air to selectively introduce air pressure into the solution circuit; and a control system including a controller configured to control flow of the solution and the compressed air. The controller is configured to perform a spray cycle in which, during a primary portion, a control valve is controlled to isolate the air circuit from the solution circuit so that the solution is pumped by the fluid pump from the solution tank to the spray nozzles, and in which, during an air pressure application portion, the control valve is controlled so that the solution is forced through the solution circuit by the compressed air.

18 Claims, 2 Drawing Sheets

(51) Int. Cl.
*A01M 7/00* (2006.01)
*B05B 1/20* (2006.01)

(52) U.S. Cl.
CPC ........ *A01M 7/0042* (2013.01); *A01M 7/0089* (2013.01); *B05B 1/20* (2013.01)

(58) Field of Classification Search
USPC .................. 239/112, 113, 124, 126, 127
See application file for complete search history.

(56) References Cited

U.S. PATENT DOCUMENTS

| | | | | |
|---|---|---|---|---|
| 4,530,465 | A * | 7/1985 | Gauchet | A01M 7/0089 239/127 |
| 4,721,245 | A * | 1/1988 | van Zweeden | A01M 7/0092 239/10 |
| 4,723,709 | A * | 2/1988 | Curran, Jr. | A01M 7/0042 239/110 |
| 4,809,909 | A * | 3/1989 | Kukesh | B29B 7/7447 239/1 |
| 5,133,500 | A * | 7/1992 | Simpson | A01M 7/0082 239/150 |
| 5,337,959 | A * | 8/1994 | Boyd | A01M 7/0089 239/127 |
| 5,368,815 | A * | 11/1994 | Kasting, Jr. | A61L 2/18 422/3 |
| 5,433,380 | A * | 7/1995 | Hahn | A01M 7/0085 134/169 R |
| 5,816,498 | A * | 10/1998 | Smith, Jr. | A01G 7/06 239/172 |
| 5,934,561 | A * | 8/1999 | Knight | A01M 7/0089 239/124 |
| 6,478,236 | B1 * | 11/2002 | Norman | A01M 7/0092 239/112 |
| 6,499,671 | B1 * | 12/2002 | Sands | A01G 7/06 239/159 |
| 6,817,541 | B2 * | 11/2004 | Sands | A01G 7/06 210/760 |
| 8,800,887 | B2 * | 8/2014 | Moeller | A01M 7/0089 239/159 |
| 2006/0192024 | A1 * | 8/2006 | Wysong | A62C 27/00 239/8 |
| 2008/0197207 | A1 * | 8/2008 | Engelbrecht | F04B 43/02 239/1 |
| 2010/0200668 | A1 * | 8/2010 | Hahn | A01C 23/007 239/1 |
| 2014/0252111 | A1 * | 9/2014 | Michael | A01M 7/0089 239/11 |
| 2016/0309647 | A1 * | 10/2016 | Bittner | A01C 23/047 |
| 2017/0006852 | A1 | 1/2017 | Engelbrecht et al. | |
| 2017/0072420 | A1 * | 3/2017 | Meyer | A01M 7/0071 |
| 2017/0144180 | A1 * | 5/2017 | Trask | B05B 1/02 |
| 2018/0369851 | A1 * | 12/2018 | Engelbrecht | A01M 7/0089 |
| 2019/0009285 | A1 * | 1/2019 | Zimmerman | A01M 7/005 |
| 2019/0022687 | A1 * | 1/2019 | Brooks | B05B 15/55 |

OTHER PUBLICATIONS

Deere & Company, Excerpts from Operator's Manual View, Operate Boom Air Purge—If Equipped, Mar. 27, 2015. (2 pages).
Hagie, Excerpts from STS 12 Operators Manual, Sections 3-46 through 3-49, copyright 2015-16 (6 pages).
Michigan Sportsman Forum, Homemade Pressurized Sprayers, Outdoor Hub, LLC (d/b/a Carbon Media Group), website https://www.michigan-sportsman.com/threads/homemade-pressurized-sprayers.136797/, last update Jul. 30, 2013. (14 pages).
Deere & Company, R4040i Self-Propelled Sprayer Brochure, YY1414737MAS, Jul. 3, 2016. (36 pages).
Deere & Company, R4040i Self-Propelled Sprayer, The Wayback Machine Internet Archive, https://web.archive.org/web/20161204153338/http://www.deere.co.uk/en_GB/products/equipment/sprayers/self_propelled_sprayers/r4040i/r4040i.page#viewTabs, John Deere UK, Dec. 4, 2016. (2 pages).
Deere & Company, R4050i Self-Propelled Sprayer, The Wayback Machine Internet Archive, https://web.archive.org/web/20161204053831/http://www.deere.co.uk/en_GB/products/equipment/sprayers/self_propelled_sprayers/r4050i/r4050i.page, John Deere UK, Dec. 4, 2016. (2 pages).

* cited by examiner

AGRICULTURAL SPRAYER WITH COMPRESSED AIR SPRAY

CROSS-REFERENCE TO RELATED APPLICATION(S)

This application claims the benefit of U.S. Provisional Application No. 62/524,417, filed Jun. 23, 2017, which is also hereby incorporated by reference.

STATEMENT OF FEDERALLY SPONSORED RESEARCH OR DEVELOPMENT

Not applicable.

FIELD OF THE DISCLOSURE

This disclosure relates to agricultural sprayer systems.

BACKGROUND OF THE DISCLOSURE

Agricultural sprayer systems are typically used to apply various products on agricultural fields, including various fertilizers, pesticides and herbicides. In certain cases, a sprayer may need to apply multiple types of products, such as different products for different crops. When changing products or even after a sprayer system is nominally empty, residue product may remain in the sprayer, which poses a removal issue and/or a contamination risk. As such, it is beneficial to minimize the product remaining in the sprayer system after use.

SUMMARY OF THE DISCLOSURE

The disclosure provides agricultural systems and methods for applying fluids, particularly systems and methods having a sprayer that incorporates compressed air.

In one aspect, an agricultural sprayer system includes a chassis supporting a solution tank and a boom assembly mounting spray nozzles. The sprayer system includes a solution circuit including solution lines and a fluid pump coupled to the solution tank to pump a solution from the solution tank through the solution lines to the spray nozzles; an air circuit including air lines and a source of compressed air to selectively introduce air pressure into the solution circuit; and a control system including a controller operatively coupled to at least one control valve configured to control flow of the solution and the compressed air through the solution lines. The controller is configured to perform a spray cycle in which, during a primary portion of the spray cycle, the at least one control valve is controlled to isolate the air circuit from the solution circuit so that the solution is pumped by the fluid pump from the solution tank to the spray nozzles, and in which, during an air pressure application portion of the spray cycle, the at least one control valve is controlled so that the solution in the solution lines is forced through at least a portion of the solution circuit by the compressed air from the air source.

In another aspect, a method is provided for operating an agricultural sprayer system having a chassis supporting a solution tank and a boom assembly mounting spray nozzles. The method includes applying a solution through the spray nozzles by pumping the solution from a solution tank through solution lines of a solution circuit with a solution pump to the spray nozzles during a primary portion of a spray cycle; recirculating, during the primary portion of a spray cycle, a portion of the solution from the solution lines downstream of the solution pump, through recirculation lines of a recirculation arrangement, back into the solution tank; and forcing at least part of the portion of the solution in at least one of the recirculation lines back into the solution tank by introducing a first air pressure from an air source of an air circuit into the recirculation lines during an air pressure recirculation portion of the spray cycle.

BRIEF DESCRIPTION OF THE DRAWINGS

Like reference symbols in the various drawings indicate like elements.

DETAILED DESCRIPTION

The following describes one or more example embodiments of the disclosed sprayer systems and methods, as shown in the accompanying figures of the drawings described briefly above. Various examples herein refer to the context of a sprayer system for crops. It will be understood, however, that the disclosed sprayer system may be utilized in a variety of settings. It will also be understood that, while terms such as "upper," "lower," "clockwise," "counterclockwise" and the like may be utilized below with respect to an orientation or operation depicted in a particular figure, such terms may be used in a relative sense and are not intended to limit the disclosure to the particular orientation or operation described. Various modifications to the example embodiments may be contemplated by one of skill in the art.

Figure 1:
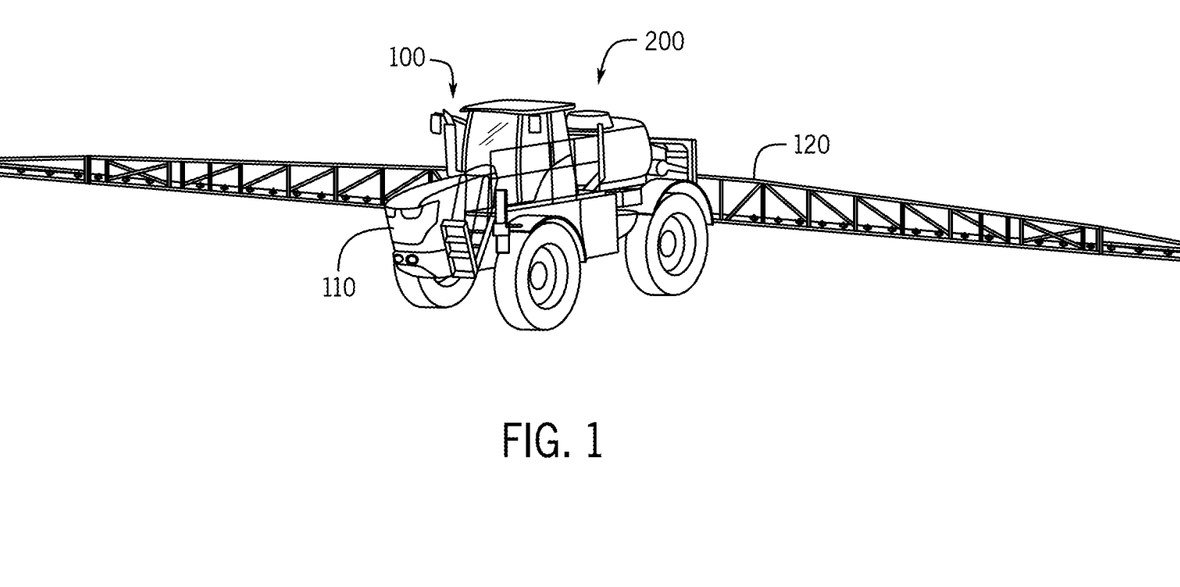
FIG. 1 is a perspective view of an example self-propelled agricultural sprayer in which a compressed air sprayer system and method according to this disclosure may be implemented.

FIG. 1 depicts an example work machine (or vehicle) 100 into which a sprayer system 200 is integrated. Generally, the work machine 100 is a self-propelled agricultural sprayer with an engine 110 that powers a propulsion system (e.g., a drive train, transmission, wheels, etc.) to propel and navigate the work machine 100 for transport and into appropriate positions and locations for application of fluid product (or "chemical solutions") by the sprayer system 200. The work machine 100 may have a chassis to support the sprayer system 200 and other aspects of the machine 100. Although depicted as a self-propelled vehicle, in some embodiments, the sprayer system 200 may be embodied as a towed system, e.g., by a separable tractor or truck. In the depicted example, the work machine 100 includes a spray boom 120 to facilitate application of the fluids by the sprayer system 200.

As will be described below, the sprayer system 200 may include a number of systems, sub-systems, circuits, arrangements, and devices for filling, rinsing, recirculating, and/or removing fluids within the system 200. As described in greater detail below, the sprayer system 200 may be considered to operate according to one or more functional cycles and/or one or more functional modes implemented within or separate from the cycles. As examples, the cycles may include application (or spray) and rinse cycles, and the modes may include one or more air pressure modes.

Figure 2:
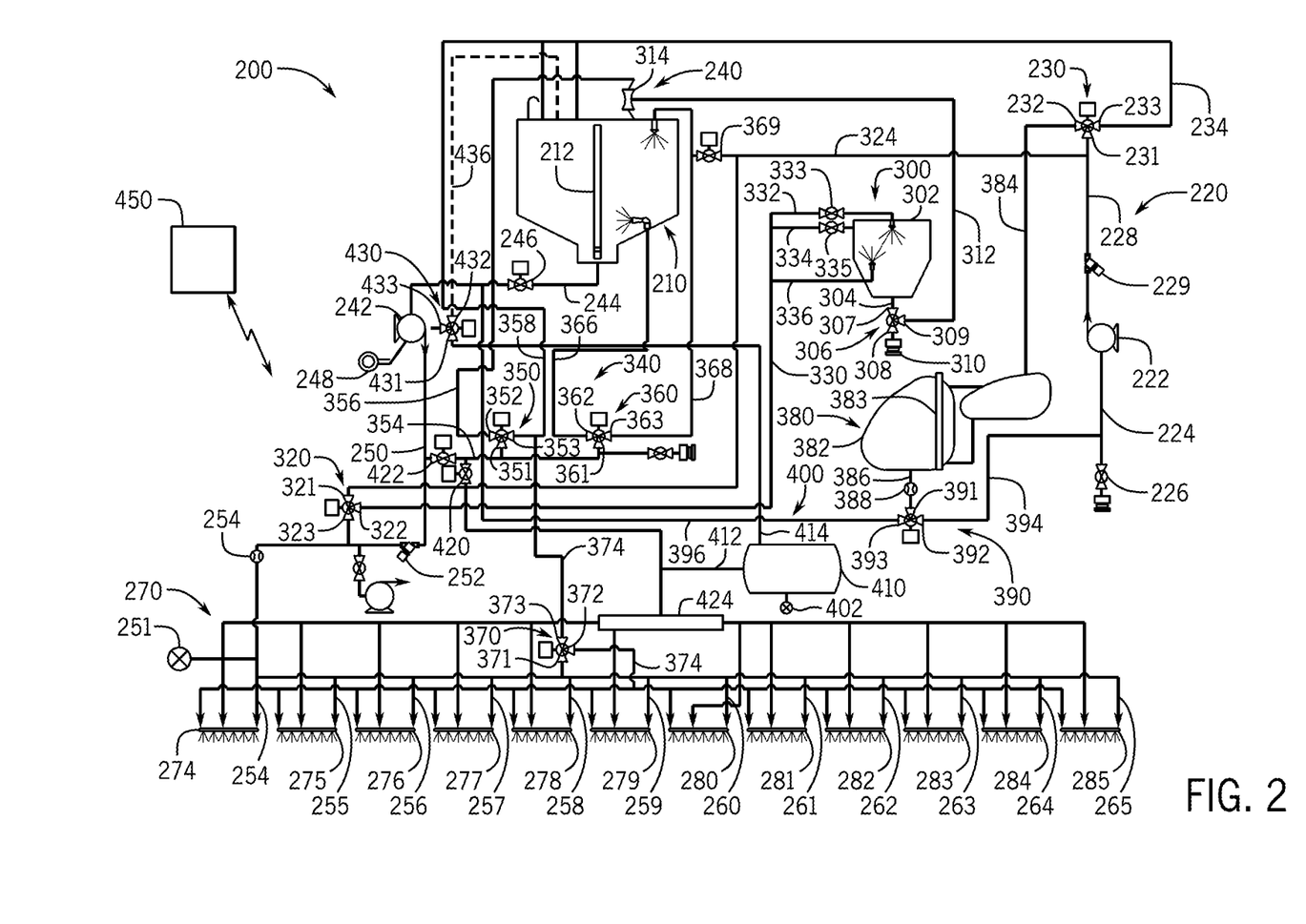
FIG. 2 is a fluid schematic of the sprayer system of FIG. 1.

FIG. 2 is an example fluid schematic of the sprayer system 200 of FIG. 1. As shown, the sprayer system 200 includes a solution tank 210 for storing chemical solutions used for application on the crops during a spray cycle. The solution tank 210 may include a sensor 212 for determining the fluid level within the tank 210. Example cycles and modes will be described below after an introduction of the various arrangements and components of the system 200.

A filling arrangement 220 is provided to supply a chemical solution to the solution tank 210. The filling arrangement 220 includes a fill pump 222 fluidly coupled to a supply line 224 equipped with a first filling valve 226, which may be connected to an external tank or other fluid source for receiving chemical solutions and/or other fluids. In the schematic of FIG. 2, an output line 228 from pump 222 is coupled to a three-way valve 230 and equipped with a strainer 229.

The three-way valve 230 may have three or more controllable positions in which combinations of three ports 231, 232, 233 are selectively opened and closed. In a first position, fluid from line 228 is directed through ports 231, 233 into line 234, which in turn is fluidly coupled to the solution tank 210. As such, with the valve 230 in the first position, the pump 222 may operate to fill the solution tank 210 with a chemical solution.

The sprayer system 200 further includes an application arrangement 240 in which the chemical solution in the solution tank 210 is deposited onto the crops. The application arrangement 240 includes a solution pump 242 that pumps fluid from the tank 210 via line 244, which may be equipped with a sump valve 246. A speed sensor 248 may be provided on the solution pump 242 to facilitate control of the pump 242 and the overall system 200. Collectively, the various lines, pump(s), and other components that distribute solution to and/or from the solution tank 210 may be considered a solution circuit.

On the output side of pump 242, a line 250, equipped with a strainer 252 and a flow meter 254, directs the fluid from the pump 242 into a boom assembly 270. The boom assembly 270 is located on or proximate to the spray boom 120 (FIG. 1). At the boom assembly 270, line 250 may include a number of branches 254-265, each connected to a respective nozzle or nozzle set 274-285. The nozzles 274-285 may be individually or collectively opened and closed to spray or prevent the spraying of fluid out of the nozzles 274-285. As such, the application arrangement 240 may be used to spray the chemical solution in solution tank 210 through nozzles 274-285 onto the crops.

In the depicted example, the boom assembly 270 has twelve sections and associated nozzles 274-285, although the sprayer system 200 may have any number of boom sections and nozzles. Pressure may be monitored in line 250 by a pressure sensor 251.

The sprayer system 200 may have a number of additional or auxiliary systems and arrangements to facilitate application of the chemical solution, as well as functions such as mixing, rinsing, and removal.

In one example, the system 200 may include an eductor arrangement 300 with an eductor hopper 302 in which system fluids may be added, mixed, and/or recirculated, including crop protection fluids. In particular, an output line 304 is fluidly coupled to a three-way suction valve 306 with ports 307, 308, 309. Port 308 of valve 306 may be coupled to a suction function 310, while port 309 is fluidly coupled to line 312 equipped with a venturi device 314 that is fluidly coupled to the solution tank 210. Accordingly, as fluid is removed from the solution tank 210 via the application arrangement 200, the resulting suction functions to pull fluid from the eductor hopper 302 into the solution tank 210.

The eductor hopper 302 may be manually filled and/or receive fluids from other portions of the system 200. For example, on an input side, the eductor arrangement 300 may include a three-way valve 320 with ports 321, 322, 323. Port 321 is fluidly coupled to a line 324, which is fluidly coupled to line 228, for receiving fluid via the filling arrangement 220. Port 322 of valve 320 is fluidly coupled to line 330 that includes three branches 332, 334, 336 with one or more valves 333, 335 may be operated to supply chemical solution and/or rinsate into the eductor hopper 302. Port 323 of valve 320 is fluidly coupled to line 250, which as noted above directs fluid to the boom assembly 270.

Further auxiliary functionality may be provided by a recirculation arrangement 340 that may have a number of elements (e.g., recirculation lines, discussed below) that function to recirculate fluid in one or more portions of the system 200 to improve mixing, warming, and/or pressure or volume characteristics. In one example, the recirculation arrangement 340 includes a first valve 350 and a second valve 360 that selectively redistribute portions of fluid from the solution circuit downstream of the pump 242.

The first valve 350 is a three-way valve with selectable ports 351, 352, 353. Port 351 is fluidly coupled via line 354 to line 250 downstream of the solution pump 242. Ports 352, 353 are respectively fluidly coupled to lines 356, 358 that extend to the solution tank 210. As such, based on control of valve 350, fluid from line 354 may be directed through lines 356, 358 back into the solution tank 210. In one example, the three-way valve 350 may be considered two functional valves. Specifically, ports 351, 352 may be considered an eductor valve, and ports 351, 353 may be considered an agitation boost valve.

The second valve 360 is also a three-way valve with selectable ports 361, 362, 363. Port 361 is also fluidly coupled via line 354 to line 250 downstream of the solution pump 242. Ports 362, 363 are respectively fluidly coupled to lines 366, 368 that extend to the solution tank 210. As such, based on control of valve 360, fluid from line 354 may be directed through lines 366, 368 back into the solution tank 210. In one example, fluid through lines 366, 368 may be sprayed through nozzles into upper and lower portions of the tank 210. In one example, the three-way valve 360 may be considered two functional valves. Specifically, ports 361, 362 may be considered an agitation valve, and ports 361, 363 may be considered a tank rinse valve.

Line 368 is also coupled to line 324 of the filling arrangement 220 via a dilution valve 369. In this manner, the fluids flowing through line 368 back into the solution tank 210 may be used to dilute the fluids flowing through line 324, or vice versa.

The recirculation arrangement 340 is further considered to include a recirculation valve 370 with ports 371, 372, 373. Port 371 of recirculation valve 370 is fluidly coupled to receive fluid from line 250, for example, when nozzles 274-285 are closed. The recirculation valve 370 may redirect the fluid through port 373 into line 374, which is fluidly coupled to line 358 that extends between valve 350 and the solution tank 210. Further, the recirculation valve 370 may redirect the fluid through port 372 into line 376, which includes a number of branches fluidly coupled to nozzles 274-285. One or more aspects of the application arrangement 240 and recirculation arrangement 340 may be considered a solution circuit, and associated lines (e.g., lines 244, 250, 356, 358, 366, 368, 374) may be considered solution lines.

The sprayer system 200 may further include a rinse arrangement 380 in which liquid rinsate, typically water, is used to rinse and/or dilute the chemical solution. The rinse arrangement 380 includes one or more rinse tanks 382 for storing the rinsate. The level of fluid in the rinse tank 382 may be monitored by a rinse tank level sensor 383.

In the depicted embodiment, the rinse tanks 382 are two fluidly coupled rinse tanks 382, although in other examples, only one rinse tank 382 may be used. The rinse tanks 382 are fluidly coupled to receive rinsate via line 384. Line 384 is fluidly coupled to port 232 of filling valve 230. As such, the fill pump 222 may be used to direct rinsate from a source through lines 224, 228, valve 230, and line 384 to appropriately fill the rinse tanks 382.

The rinse arrangement 380 further includes a rinse tank sump valve 390, which in this example, is a three-way valve with ports 391, 392, 393. Port 391 of valve 390 is fluidly coupled to line 386, which is equipped with a check valve 388 and extends to the rinse tanks 382. Port 392 is fluidly coupled to line 394, which extends to line 224. In some examples, the filling arrangement 220 may be used to fill the rinse tanks 382 via line 394, valve 390, and line 386. Port 393 is fluidly coupled to line 396, which in turn, is fluidly coupled to line 244. As a result of this arrangement, rinsate may be directed from the rinse tanks 382 to rinse various aspects of the system 200, including the application arrangement 240, as described in greater detail below.

The system 200 further includes an air arrangement (or air circuit) 400 that functions to facilitate application and removal of the chemical solution and rinsate within the system 200 during one or more air pressure modes in which air pressure is introduced into the sprayer system 200. The air pressure modes may occur during, in between, or after the application and rinse cycles.

In this example, the air arrangement 400 includes an air tank 410 monitored by an air pressure sensor 402. The air tank 410 is pressurized with compressed air by a compressor, e.g., a compressor mechanically coupled to the engine 110 of the work machine 100 (FIG. 1).

The air tank 410 has one or more outlet lines (or air lines) 412, 414. Outlet line 412 is fluidly coupled to line 354 at a first air rinse (or pressure functions air rinse) valve 420. An isolation (or pressure functions isolation) valve 422 functions to isolate line 354 from the line 250 downstream of pump 242. The outlet line 412 is also fluidly coupled to a manifold 424 with branches that extend to the nozzles 274-285. As a result of this arrangement, and as discussed in greater detail below, the air arrangement 400 may pressurize aspects of the recirculation arrangement 340 to facilitate application and/or removal of chemical solution and/or rinsate. In one embodiment, the manifold 424 may house a series of electric air valves, one for each boom section, to control the flow of air to each section. For example, the valves in the manifold 424 may be used to actuate the nozzles 274-285 by applying compressed air to open and close a respective stop valve associated with each nozzle 274-285, e.g., to control fluid flow through the nozzles 274-285.

Outlet line 414 is fluidly coupled to a second air rinse (or solution air rinse) valve 430 at port 431. In this example, the solution air rinse valve 430 may be a three-way valve with ports 431-433. Port 432 is fluidly coupled to line 436 such that the air arrangement 400 may pressurize the system 200 at the solution tank 210, thereby facilitating the application and/or removal of chemical solution and/or rinsate. Port 433 of the second air rinse valve 430 is fluidly coupled to the pump 242. In this configuration, the air arrangement 400 may provide air pressure to the pump 242. Additionally, ports 432, 433 of the second air rinse valve 430 and line 436 may function as a pump bleed arrangement. In other embodiments, the pump bleed may be implemented as separate components.

Generally, operation of the system 200 may be controlled by a control system with a controller 450 operatively coupled to one or more of the valves (e.g., valves 226, 230, 246, 306, 320, 383, 335, 350, 360, 369, 370, 390, 420, 422, 430), sensors (e.g., sensors 212, 248, 251, 383, 402), and other components of the system 200. The controller 450 may be configured as a computing device with associated processor devices and memory architectures, as a hard-wired computing circuit (or circuits), as a programmable circuit, as a hydraulic, electrical or electro-hydraulic controller, or otherwise. As such, the controller 450 may be configured to execute various computational and control functionality with respect to the sprayer system 200 and/or work machine 100 (or other machinery). In some embodiments, the controller 450 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 450 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 450 may be in electronic, hydraulic, mechanical, or other communication with various other systems or devices of the sprayer system 200 and/or work machine 100 (or other machinery), such as various actuators, sensors, and other devices within (or outside of) the work machine 100. The controller 450 may communicate with other systems or devices (including other controllers) in various known ways, including via a CAN bus (not shown), via wireless or hydraulic communication means, or otherwise. The controller 450 is typically arranged on the work machine 100 and/or sprayer system 200, although other locations are possible including various remote locations.

In some embodiments, the controller 450 may be configured to receive input commands and to interface with an operator via a human-machine interface, which may be disposed inside a cab of the work machine 100 for easy access by the operator. The human-machine interface may be configured in a variety of ways, including an input device with one or more joysticks, various switches or levers, one or more buttons, a touchscreen interface that may be overlaid on a display, a keyboard, a speaker, a microphone associated with a speech recognition system, or various other human-machine interface devices. A display of the interface may be implemented as a flat panel display or other display type that is integrated with an instrument panel or console of the work machine 100.

The controller 450 may include and/or cooperate with a communication component, which may be any suitable system for receiving data from and transmitting data, such as a Bluetooth® transceiver, a satellite transceiver, a radio transceiver, a cellular transceiver, an LTE transceiver and/or a Wi-Fi transceiver. Further details regarding operation of the controller 450 will be provided below.

Accordingly, during operation in one embodiment, the controller 450 may monitor a number of input parameters, including signals from the pump speed sensor 248, boom pressure sensor 251, solution tank sensor 212, rinse tank level sensor 383, and air pressure sensor 402. The controller 450 may also receive user input, e.g. from a user input device or communications system. Further, the controller 450 may consider timing and/or location considerations. In response, the controller 450 may send control signals to actuate various aspects of the system 200, including to the nozzles 274-285, the compressor associated with the air tank 410, and various valves (e.g., valves 226, 230, 246, 306, 320, 350, 360, 369, 390, 420, 422, 430) to direct liquid (e.g., chemical solution and/or rinsate) and air through the system 200. In one embodiment, the controller 450 may store and implement preprogrammed instructions that automatically perform the functions described below, although other examples may utilize operator intervention.

As introduced above, the sprayer system 200 may operate during a spray (or application) cycle to apply the chemical solution. In particular, upon filling the solution tank 210 with the filling arrangement 220, the controller 450 may actuate the solution pump 242 and various valves (e.g., valve 286) to direct the chemical solution through the system 200 and out of the nozzles 274-285. As also noted above, the spray cycle may also be implemented with auxiliary functions such as the recirculation arrangement 340 and/or eductor arrangement 300.

As will now be described, the air arrangement 400 may be used to facilitate application of the chemical solution during the spray cycle, particularly as the solution tank 210 reaches a relatively low or empty level. This enables more productive use of the chemical solution than would otherwise be possible. Moreover, the air arrangement 400 minimizes or reduces the amount of chemical solution within the system 200 after the spray cycle, thereby enabling more effective use of the rinse arrangement 380. The air arrangement 400 may be initiated with a user interface associated with the controller 450. One or more of the air pressure modes discussed below may be enabled and/or disabled by the operator.

Generally, the system 200 may operate in a primary portion of the spray cycle in which the air arrangement 400 is isolated from the solution circuit. However, in one embodiment, the air arrangement 400 may be used in one or more portions of the spray cycle as follows. As the solution level in the solution tank 210 reaches a predetermined level, operation of the air arrangement 400 in a first air pressure mode is initiated by the controller 450. The predetermined level may be based on a number of factors, including flow rate or rate of level change of the solution in the tank 210, empirical evidence, and/or timing issues associated with fluid flow and pressurization through the system 200. In one example, the first air pressure mode may be initiated approximately 90 seconds before the solution tank 210 would be effectively empty without using the air arrangement 400, although this timing may vary.

In any event, upon reaching the predetermined solution level and during the first air pressure mode, the controller 450 closes isolation valve 422 and opens the first air rinse valve 420. As a result, the air from the air tank 410 is released through outlet line 412 into line 354 to pressurize this portion of the system 200, while isolating line 354 from line 250.

At this point, the controller 450 may actuate the valves 350, 360 in a sequence to pressurize each of lines 356, 358, 366, 368 with air from the air arrangement 400. For example, when ports 351, 352 of valve 350 are open, port 353 of valve 350 is closed, and valve 360 is closed, the air pressure from the air arrangement 400 forces any chemical solution in line 356 back into the solution tank 210. Similarly, when ports 351, 353 of valve 350 are open, port 352 of valve 350 is closed, and valve 360 is closed, the air pressure from the air arrangement 400 forces any chemical solution in line 358 back into the solution tank 210. When ports 361, 362 of valve 360 are open, port 363 of valve 360 is closed, and valve 350 is closed, the air pressure from the air arrangement 400 forces any chemical solution in line 366 back into the solution tank 210. Similarly, when ports 361, 363 of valve 360 are open, port 362 of valve 360 is closed, and valve 350 is closed, the air pressure from the air arrangement 400 forces any chemical solution in line 368 back into the solution tank 210. In between each action, the valves 350, 360 may be completely closed to enable the compressor to recharge the air tank 410, although with a tank of sufficient size, one or more of these intermediate steps may be avoided. In this arrangement, the air valves in the manifold 424 may be closed such that the air pressure is directed into each of lines 356, 358, 366, 368. After the liquid in lines 356, 358, 366, 368 has been directed back into the solution tank 210, in one example, any excess pressure may be vented from the solution tank 210.

During the first air pressure mode, the work machine 100 may continue to apply chemical solution to the crops. For example, the isolation valve 422 enables the solution pressure functions to be isolated such that lines 356, 358, 366, 368 are purged of solution, even when line 250 is pressurized for spraying through the boom assembly 270. Moreover, after purging the solution from lines 356, 358, 366, 368 with compressed air, the solution in tank 210 may be directed out of the solution tank 210 by the pump 242 and applied out of the nozzles 274-285, as described above. In this manner, the first air pressure mode may be considered an air application recirculation portion of the spray cycle. As a result of the first air pressure mode, the chemical solution in lines 356, 358, 366, 368 may be utilized as the solution tank 210 empties to augment the amount of chemical solution applied to the crops.

A more detailed example of the first air pressure mode is provided below. The first air pressure mode may be implemented with time-based triggers, pressure-based triggers, or a combination of pressure- and time-based triggers. In the description below, examples of suitable time-based triggers or pressure-based triggers are provided. 0) Pressure function air rinse needs to approximately 1:30-2:00 minutes before the tank 210 is estimated to be empty. This enables pressure functions to stay active as long as possible, but to have the air rinse in these sections complete before starting the spray line. The maximum spray rate may be near 400 L/min, so beginning this check at 1000 L tank level should be adequate. At this level, check the solution flow rate at the flow meter 254 and calculate the level 2:00 minutes before empty as the pressure function air rinse trigger level. 1) Tank 210 reaches calculated air rinse trigger level. 2) Verify air pressure is above 7 bars. If pressure threshold is not met, warn that air pressure is low and abort procedure. 3) Close the pressure functions isolation valve 422. 4) Close the agitation valve 360 (e.g., ports 361, 362). 5) Close the agitation boost valve 350 (e.g., ports 351, 353). 6) Open the eductor valve 350 (e.g., ports 351, 352) to 100%. 7) Open the pressure functions air rinse valve 420 for 4 seconds (or until pressure sensor 402 indicates air pressure drops to 2.5 bar), then close. 8) Close the eductor valve 350 (e.g., ports 351, 352). 9) Open agitation boost valve 350 (e.g., ports 351, 353) to 100%. 10) Wait for the air pressure to recover to above 7 bar, which should occur approximately 20 seconds after the valve 422 closes. If pressure threshold is not met after approximately 30 seconds, warn that air pressure is low and abort procedure. 11) Open the pressure functions air rinse valve 420 for 4 seconds (or until pressure sensor 402 indicates air pressure drops to 2.5 bar), the close the valve. 12) Close agitation boost valve 350 (e.g., ports 351, 353). 13) Open agitation valve 360 (e.g. ports 361, 362) to 100%.

14) Wait for the air pressure to recover to above 7 bar, which should occur approximately 20 seconds after the pressure functions air rinse valve 420 closes. If pressure threshold is not met after 30 seconds, warn that air pressure is low and abort procedure. 15) Open the pressure functions air rinse valve 420 for 4 seconds (or until pressure sensor 402 indicates air pressure drops to 2.5 bar), then close. 16) Close the agitation valve 360 (e.g. ports 361, 362). 17) Open tank rinse valve 360 (e.g. ports 361, 363) to 100%. 18) Wait for the air pressure to recover to above 7 bar, which should occur approximately 20 seconds after the pressure functions air rinse valve 420 closes. If pressure threshold is not met after 30 seconds, warn that air pressure is low and abort procedure. 19) Open the pressure functions air rinse valve 420 for 4 seconds (or until pressure sensor 402 indicates air pressure drops to 2.5 bar), then close. 20) Close the tank rinse valve 360 (e.g. ports 361, 363). 21) Proceed to second air pressure mode. As noted above, one or more of the steps above may be omitted or modified, and one or more additional steps may be added.

After forcing chemical solution from the lines 356, 358, 366, 368, operation of the air arrangement 400 in a second air pressure mode is initiated by the controller 450. In particular, the second air pressure mode may be initiated after the pump 242 has drawn all of the chemical solution from the first air pressure mode out of the tank 210 such that the tank 210 is substantially empty. In this mode, the controller 450 may close the sump valve 246, close port 232 and open ports 431, 433 to force air into the pump 242 and lines 250 to press remaining solution out of the nozzles 274-285. The air pressure may be introduced at the pump 242 (as shown) or upstream of the pump 242, and operation of the pump 242 may be terminated prior to or during the introduction of the air pressure. In effect, the air arrangement 400 operates to introduce air pressure into the application arrangement 240 for use during the spray cycle, thereby pushing additional chemical solution through the pump 242 with compressed air for application through the nozzles 274-285. In this manner, the second air pressure mode may be considered an air pressure application mode of the spray cycle. This mode functions to utilize more of the chemical solution that would otherwise be possible, and reducing the amount of chemical solution that must be subsequently rinsed and removed.

A more detailed example of the second air pressure mode is provided as follows: 0) The operator is spraying normally and the master is on. 1) Monitor trigger conditions for conclusion of first air pressure mode and initiation of second air pressure mode. Detect the tank is empty with sensor 212. In one example, this may be determined by Tank Empty Volume [L]=A*Spray Flow Rate [L/min]−B, in which A and B are parameters that may be tuned. As an example, A=0.2 and B=8. Verify the air pressure is above 7 bars. If the pressure is not above 7 bars, warn the air pressure is low and abort procedure, which means spraying the tank empty without air rinse. 2) Upon triggering, the pressure function isolation valve 422 is closed. Close the tank sump valve 246. Wait 3 seconds for the valve actuator to complete closing of valve 246. Open the solution air rinse valve 430. 3) Stop the solution pump 242. This protects pump 242 from running dry and may occur approximately five seconds after the command to open solution air rinse valve 430. 4) Section control may continue to change sections as needed. 5) This mode may be treated as master off as related to sending info to crop monitoring and/or control systems such that no information may be sent, and painting of the field map should also stop. This is acceptable, considering that the mode may last approximately 15-30 seconds in which only a small amount of ground may be traversed. 6) Operator may actuate a master off to stop spraying. Close the section valves as would normally happen with a master off. Recirculation is not necessary because the solution pump 242 is already off. A watchdog timer (e.g., 1 minute) may be provided to prevent air compressor damage. Pressure in system may be monitored to spray a continuous pattern, which may deliver approximately 7-20 additional liters of product. 7) Reset solution system for spraying, including closing the solution air rinse valve 430 and opening the pressure functions isolation valve 422. 8) Operator may switch the solution pump switch to the off position, and then back on to get the pump running again (and refill the solution tank). Cycling the pump switch may allow agitation and recirculation to reset if they were changed by the above routine. As noted above, one or more of the steps above may be omitted or modified, and one or more additional steps may be added.

As one example, the amount of chemical solution remaining in the system 200 after the spray cycle without using the first and second air pressure modes is approximately 47 liters, while the amount of chemical solution remaining when implementing the first and second air pressure modes is approximately 24 liters. As such, in this example, the system 200 may utilize an additional 23 liters of chemical solution for crop application, and the amount of remaining chemical solution is reduced by almost 50%. Although the first and second air arrangement modes of the system 200 are described above, one or both of the modes may be omitted.

After the spray cycle, the controller 450 may initiate a rinse cycle to dilute and remove any remaining chemical solution in the system 200. At this point, the first and second air pressure modes have removed more of the chemical solution than is typical in conventional systems, thereby improving the effectiveness of the rinse cycle since less chemical solution must be diluted.

The rinse cycle may operate in any suitable manner to circulate the rinsate in the rinse tanks 382 through the various lines and arrangements of the system 200 to flush or otherwise remove the chemical solution. In one example of the rinse cycle, the rinsate flows from the rinse tanks 382 through valve 390, along lines 396, 244, through the pump 242, and through line 250 of the boom assembly 270. At this point, the rinsate is recirculated from the boom assembly 270 back into the recirculation line 374 by the recirculation arrangement 340. The rinsate may be used to rinse lines 356, 358, 366, 368 by sequentially controlling valves 350, 360 and directing the rinsate into the solution tank 210. Other portions of the system 100 may be rinsed, including the eductor arrangement 300. From the solution tank 210, the solution pump 242 may pump the rinsate out the nozzles 274-285. The rinse cycle may be repeated a number of times to continue to dilute and remove chemical solution. The distribution of the rinsate by the pump 242 may be considered a primary portion of the rinse cycle in which the solution arrangement 240 and/or rinse arrangement 340 from the air circuit 400.

Near the end of each rinse cycle or all of the rinse cycles, a portion of the rinsate may remain in the various portions of the system 200. At this point, the controller 450 may initiate a third air pressure mode with the air arrangement 400 in which valve 420 is closed and ports 431, 432 of valve 430 are opened such that the air pressurizes the solution tank 210 via line 436. When the solution tank 210 and line 438 are sufficiently pressurized, the controller 450 may close valve 430 and valve 422 and valve 420 is opened. In these positions, valves 350, 360 may be actuated to sequentially pressurize lines 356, 358, 366, 368 to force any remaining rinsate within the lines 356, 358, 366, 368 back into the solution tank 210.

After emptying lines 356, 358, 366, 368, the controller 450 may close valve 420 and open ports 431, 433 such that air from the air arrangement is directed into the solution pump 242 to pressurize line 250. This functions to force any remaining rinsate through line 250 into the manifold 424. In one example, the recirculation arrangement 340 directs the rinsate in the manifold 424 through valve 370, into line 374, and back into the solution tank 210. In effect, the third air pressure mode collects the rinsate remaining in the system 200 in the solution tank 210. In this manner, the third air pressure mode may be considered an air pressure portion of the rinse cycle. Subsequently, the solution tank 210 may be emptied by actuating a drain nozzle (not shown) at the bottom of the tank 210.

This may particularly be useful for operating in areas with more strict environmental considerations, such as locations with a containment pad at their farm for handling drained liquid from sprayers. This process allows air to be used to empty all the solution lines into the spray tank, and the product can be drained for processing in a phytobac.

A more detailed example of the third air pressure mode is provided below. The third air pressure mode may be implemented with time-based triggers, pressure-based triggers, or a combination of pressure- and time-based triggers. In the description below, examples of suitable time-based triggers or pressure-based triggers are provided. 0) Initiate third air pressure mode. Solution pump switch is in the off position, thereby resulting in the tank sump valve 246 to be closed; the recirculation valve 370 is in the spray position; and valves 350, 360 are closed. 1) Verify the air pressure is above 7 bars. If the pressure is not above 7 bars, warn the air pressure is low and abort procedure. 2) Open the solution air rinse valve 430 to initiate air entering the system. 3) Wait for the air pressure to recover to 7 bars. If this does not happen in 2 minutes, abort the procedure and warn air pressure is low. 4) Open the eductor valve 350 (e.g., ports 351, 352) to 100% for 3 seconds (or until pressure sensor 402 indicates air pressure drops to 2.5 bar), then close. 5) Wait for the air pressure to recover to 7 bars. If this does not happen in 2 minutes, abort the procedure and warn air pressure is low. 6) Open the agitation boost valve 350 (e.g., ports 351, 353) to 100% for 3 seconds (or until pressure sensor 402 indicates air pressure drops to 2.5 bar), then close. 7) Wait for the air pressure to recover to 7 bars. If this does not happen in 2 minutes, abort the procedure and warn air pressure is low. 8) Open the agitation valve 360 (e.g., ports 361, 362) to 100% for 3 seconds (or until pressure sensor 402 indicates air pressure drops to 2.5 bar), then close. 9) Wait for the air pressure to recover to 7 bars. If this does not happen in 2 minutes, abort the procedure and warn air pressure is low. 10) Open the tank rinse valve 360 (e.g., ports 361, 363) to 100% for 3 seconds (or until pressure sensor 402 indicates air pressure drops to 2.5 bar), then close. 11). Wait for the air pressure to recover to 7 bars. If this does not happen in 2 minutes, abort the procedure and warn air pressure is low. 12). Open the recirculation valve 370 to recirculation position (ports 371, 373) for 3 seconds (or until pressure sensor 402 indicates air pressure drops to 2.5 bar), then close. 13). Close the solution air rinse valve 430. 14). Air rinsing procedure is now complete. The operator may go to the loading station and open the tank drain valve to drain. As noted above, one or more of the steps above may be omitted or modified, and one or more additional steps may be added.

In effect, the air arrangement is implemented as part of continuous and connected processes with the application of the chemical solution and the rinsing of the system 200. In one embodiment, the cycles (and portions of cycles) may be implemented in a sequence. For example, the primary portion of the spray cycle may be followed by the air pressure recirculation portion of the spray cycle, which may be followed by the air pressure application portion of the spray cycle, which may be followed by the primary portion of the rinse cycle, which may be followed by the air pressure portion of the rinse cycle. In some embodiments, one or more portions may be omitted and//or performed in a different sequence.

Accordingly, embodiments may utilize compressed air to more thoroughly spray the solution tank empty rather than using the pump alone. This reduces the volume of spray liquid remaining in the spray system, thereby making the sprayer system 200 easier to rinse, and a given rinse tank volume may achieve a higher dilution factor. In one embodiment, the system 200 may accomplish this by isolating the sprayer pressure functions near the end of the tank 210 and blowing the fluid from these functions back into the tank 210. Once the pump 242 has drawn in all the solution from the solution tank 210, the sump valve 246 is closed and compressed air is used to press the remaining solution out of the boom at a pressure close to the target spray pressure. The valves 420, 430 allowing the compressed air to enter the solution circuit have the capability to regulate the flow of air without requiring a complex metering system. Although not shown, in one embodiment, the system 200 may include an air regulator or other type of air pressure control device to control the air pressure to ensure that the pressure being applied within the system 200 is at an appropriate level, e.g., to maintain a target spray pressure without exceeding limits. After this, the existing sprayer rinse cycle may be run to rinse the system 200. A higher dilution factor may be achieved because there is less remaining solution to rinse. After the rinse cycle is complete, the system 200 may use the compressed air to blow all rinsate from the sprayer plumbing and boom assembly into the solution tank, where it may be easily drained into a sprayer containment pad. This significantly reduces any operator risk of having remaining rinsate in the next spraying tank risk.

Although one configuration of a sprayer system 200 is described below, embodiments may be implemented in other configurations. In particular, the air arrangement 400 may be utilized with other application arrangements, e.g., to provide pressurized air upstream of a pump to facilitate application of solution through the spray nozzles and/or to purge one or more solution lines back into the the solution tank. Similarly, the air arrangement 400 may be utilized with other rinse arrangements, e.g., to provide pressurized air to direct one or more lines of rinse liquid back into a rinse tank.

Accordingly, the examples discussed above provide a more thorough and complete rinsing, as well has a higher utilization rate of product use. Compressed air is used to remove more chemical solution at the end of the spray tank and more rinsate at the end of each rinse cycle. Using air to assist removal of these remnant amounts improves the rinsability and dilution level of the sprayer system.

Also, the following examples are provided, which are numbered for easier reference.

1. An agricultural sprayer system having a chassis supporting a solution tank and a boom assembly mounting spray nozzles, the sprayer system comprising: a solution circuit including solution lines and a fluid pump coupled to the solution tank to pump a solution from the solution tank through the solution lines to the spray nozzles; an air circuit including air lines and a source of compressed air to selectively introduce air pressure into the solution circuit; and a control system including a controller operatively coupled to at least one control valve configured to control flow of the solution and the compressed air through the solution lines; wherein the controller is configured to perform a spray cycle in which, during a primary portion of the spray cycle, the at least one control valve is controlled to isolate the air circuit from the solution circuit so that the solution is pumped by the fluid pump from the solution tank to the spray nozzles, and in which, during an air pressure application portion of the spray cycle, the at least one control valve is controlled so that the solution in the solution lines is forced through at least a portion of the solution circuit by the compressed air from the air source.

2. The sprayer system of example 1, wherein, during the air pressure application portion of the spray cycle, the compressed pressure is introduced into the solution circuit at the fluid pump or upstream of the fluid pump.

3. The agricultural sprayer system of example 1, further comprising a sump valve arranged on a first solution line of the solution lines between the solution tank and the fluid pump and operatively coupled to the controller, and wherein controller is configured to open the sump valve during the primary portion of the spray cycle and to close the sump valve during the air pressure application portion of the spray cycle.

4. The agricultural sprayer system of example 1, wherein the controller is configured to initiate the air pressure application portion of the spray cycle when the solution tank is approximately empty.

5. The agricultural sprayer system of example 1, wherein the controller is configured to stop operation of the fluid pump prior to or during the air pressure application portion of the spray cycle.

6. The agricultural sprayer system of example 1, wherein the solution circuit further includes a recirculation arrangement comprising recirculation lines fluidly coupled to at least one of the solution lines downstream of the fluid pump and extending to the solution tank such that a portion of the solution from the solution lines is selectively recirculated back into the solution tank, and wherein the air circuit is configured to selectively introduce air pressure into the recirculation arrangement via the at least one control valve, and wherein the controller is configured to, during the primary portion of the spray cycle, control the at least one control valve such that the air circuit is isolated from the recirculation arrangement, and during an air pressure recirculation portion of the spray cycle, control the at least one control valve such that the solution in at least one of the recirculation lines is forced into the solution tank with the compressed air from the air source.

7. The agricultural sprayer system of example 6, wherein the controller is configured to initiate the air pressure recirculation portion of the spray cycle based on a solution level within the solution tank.

8. The agricultural sprayer system of example 7, wherein the controller is configured to maintain operation of the fluid pump to pump the solution from the solution tank through the solution lines to the spray nozzles during the air pressure recirculation portion of the spray cycle.

9. The agricultural sprayer system of example 6, wherein the recirculation lines include a first recirculation line selectively fluidly coupled to the at least one of the solution lines downstream of the solution pump to receive the portion of the solution, a second recirculation line selectively fluidly coupled to the first recirculation line and the solution tank, and a third recirculation line selectively fluidly coupled to the first recirculation line and the solution tank, and wherein the at least one control valve include a first control valve that selectively couples the first recirculation line to the at least one of the solution lines, a second control valve that selectively couples the second recirculation line to the first recirculation line, a third control valve that selectively couples the third recirculation line to the first recirculation line, and a fourth control valve that selectively couples at least one of the air lines to the first recirculation line, and wherein the controller is configured to, during the primary portion of the spray cycle, close the fourth control valve such that the air circuit is isolated from the recirculation arrangement, during a first part of the air pressure recirculation portion of the spray cycle, close the first and third control valves and open the second and fourth control valves such that any of the solution in the second recirculation line is forced into the solution tank by the air pressure from the air source, and during a second part of the air pressure recirculation portion of the spray cycle, close the first and second control valves and open the third and fourth control valves such that any of the solution in the third recirculation line is forced into the solution tank by the air pressure from the air source.

10. The agricultural sprayer system of example 6, wherein air lines include at least one first air line extending between the air source and at least one of the solution lines at a first position of the solution circuit at the solution pump or upstream of the solution pump and at least one second air line extending between the air source and at least one of the recirculation lines, and wherein the at least one control valve includes at least one first control valve selectively fluidly coupling the at least one first air line to the at least one of the solution lines at the first position and at least one second control valve selectively fluidly coupling the second air line to the at least one of the recirculation lines.

11. The agricultural sprayer system of example 10, wherein the controller is configured to, during the primary portion of the spray cycle, close the at least one first control valve such that the air circuit is isolated from the solution circuit and close the at least one second control valve such that the air circuit is isolated from the recirculation arrangement, during the air pressure application portion of the spray cycle, close the at least one second control valve and open the at least one first control valve such that the solution in the solution lines is forced through at least a portion of the solution circuit by the compressed air from the air source, and during the air pressure recirculation portion of the spray cycle, close the at least one first control valve and open the at least one second control valve such that the solution in at least one of the recirculation lines is forced into the solution tank by the compressed air from the air source.

12. The agricultural sprayer system of example 11, wherein the controller is configured to terminate the primary portion of the spray cycle and initiate the air pressure recirculation portion of the spray cycle when the solution in the solution tank reaches a first predetermined level, and wherein the controller is configured to terminate the air pressure recirculation portion of the spray cycle and initiate the air pressure application portion of the spray cycle when the solution tank is approximately empty.

13. The agricultural sprayer system of example 1, further comprising a rinse arrangement including rinse tank configured to contain a rinsate and rinse lines selectively fluidly coupled to the rinse tank and the solution lines, and wherein the controller is configured to perform a primary portion of a rinse cycle in which the at least one control valve is controlled such that the rinsate is directed from the rinse tank, through the rinse lines, and into the solution lines, and wherein the controller is configured to perform an air pressure portion of the rinse cycle in which the at least one control valve is controlled to force at least a portion the rinsate in the solution lines into the solution tank with the air pressure from the air source.

14. The agricultural sprayer system of example 13, wherein the controller is configured to initiate the air pressure portion of the rinse cycle after the primary portion of the rinse cycle.

15. A method for operating an agricultural sprayer system having a chassis supporting a solution tank and a boom assembly mounting spray nozzles, the method comprising: applying a solution through the spray nozzles by pumping the solution from a solution tank through solution lines of a solution circuit with a solution pump to the spray nozzles during a primary portion of a spray cycle; recirculating, during the primary portion of a spray cycle, a portion of the solution from the solution lines downstream of the solution pump, through recirculation lines of a recirculation arrangement, back into the solution tank; and forcing at least part of the portion of the solution in at least one of the recirculation lines back into the solution tank by introducing a first air pressure from an air source of an air circuit into the recirculation lines during an air pressure recirculation portion of the spray cycle.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. An agricultural sprayer system having a chassis supporting a solution tank and a boom assembly mounting spray nozzles, the sprayer system comprising:
    a solution circuit including solution lines and a fluid pump coupled to the solution tank to pump a solution from the solution tank through the solution lines to the spray nozzles, wherein the solution circuit further includes a recirculation arrangement with recirculation lines fluidly coupled to at least one of the solution lines downstream of the fluid pump and extending to the solution tank such that a portion of the solution from the solution lines is selectively recirculated back into the solution tank;
    an air circuit including air lines and a source of compressed air to selectively introduce air pressure into the solution circuit, wherein the air circuit is configured to selectively introduce air pressure into the recirculation arrangement via at least one control valve; and
    a control system including a controller operatively coupled to the at least one control valve configured to control flow of the solution and the compressed air through the solution lines, wherein the controller is configured to perform a spray cycle including:
        a primary portion of the spray cycle in which the at least one control valve is controlled to isolate the air circuit from the solution circuit and the recirculation arrangement while the solution is pumped by the fluid pump from the solution tank to the spray nozzles;
        an air pressure application portion of the spray cycle in which the at least one control valve is controlled so that the solution in the solution lines is forced through at least a portion of the solution to the spray nozzles by the compressed air from the air source; and
        an air pressure recirculation portion of the spray cycle in which the at least one control valve is controlled so that the solution in at least one of the recirculation lines is forced into the solution tank with the compressed air from the air source while the solution is pumped by the fluid pump from the solution tank to the spray nozzles.

2. The agricultural sprayer system of claim 1, wherein, during the air pressure application portion of the spray cycle, the compressed air is introduced into the solution circuit at the fluid pump or upstream of the fluid pump.

3. The agricultural sprayer system of claim 1, further comprising a sump valve arranged on a first solution line of the solution lines between the solution tank and the fluid pump and operatively coupled to the controller, and wherein the controller is configured to open the sump valve during the primary portion of the spray cycle and to close the sump valve during the air pressure application portion of the spray cycle.

4. The agricultural sprayer system of claim 1, wherein the controller is configured to initiate the air pressure application portion of the spray cycle when the solution tank is substantially empty.

5. The agricultural sprayer system of claim 1, wherein the controller is configured to stop operation of the fluid pump prior to or during the air pressure application portion of the spray cycle.

6. The agricultural sprayer system of claim 1, wherein the controller is configured to initiate the air pressure recirculation portion of the spray cycle based on a solution level within the solution tank.

7. The agricultural sprayer system of claim 1, wherein the controller is configured to maintain operation of the fluid pump to pump the solution from the solution tank through the solution lines to the spray nozzles during the air pressure recirculation portion of the spray cycle.

8. The agricultural sprayer system of claim 1, further comprising:
    a rinse arrangement including rinse tank configured to contain a rinsate and rinse lines selectively fluidly coupled to the rinse tank and the solution lines;
    wherein the controller is configured to perform a primary portion of a rinse cycle in which the at least one control valve is controlled such that the rinsate is directed from the rinse tank, through the rinse lines, and into the solution lines; and wherein the controller is configured to perform an air pressure portion of the rinse cycle in which the at least one control valve is controlled to force at least a portion the rinsate in the solution lines into the solution tank with the air pressure from the air source.

9. The agricultural sprayer system of claim 8, wherein the controller is configured to initiate the air pressure portion of the rinse cycle after the primary portion of the rinse cycle.

10. An agricultural sprayer system having a chassis supporting a solution tank and a boom assembly mounting spray nozzles, the sprayer system comprising:

a solution circuit including solution lines and a fluid pump coupled to the solution tank to pump a solution from the solution tank through the solution lines to the spray nozzles, wherein the solution circuit further includes a recirculation arrangement with recirculation lines fluidly coupled to at least one of the solution lines downstream of the fluid pump and extending to the solution tank such that a portion of the solution from the solution lines is selectively recirculated back into the solution tank:

an air circuit including air lines and a source of compressed air to selectively introduce air pressure into the solution circuit, wherein the air circuit is configured to selectively introduce air pressure into the recirculation arrangement via at least one control valve; and a control system including a controller operatively coupled to the at least one control valve configured to control flow of the solution and the compressed air through the solution lines;

wherein the controller is configured to perform a spray cycle in which, during a primary portion of the spray cycle, the at least one control valve is controlled to isolate the air circuit from the solution circuit and the recirculation arrangement so that the solution is pumped by the fluid pump from the solution tank to the spray nozzles, and in which, during an air pressure application portion of the spray cycle, the at least one control valve is controlled so that the solution in the solution lines is forced through at least a portion of the solution circuit by the compressed air from the air source, including, during an air pressure recirculation portion of the spray cycle, the at least one control valve is controlled so that the solution in at least one of the recirculation lines is forced into the solution tank with the compressed air from the air source;

wherein the recirculation lines include a first recirculation line selectively fluidly coupled to the at least one of the solution lines downstream of the solution pump to receive the portion of the solution, a second recirculation line selectively fluidly coupled to the first recirculation line and the solution tank, and a third recirculation line selectively fluidly coupled to the first recirculation line and the solution tank; and wherein the at least one control valve includes a first control valve that selectively couples the first recirculation line to the at least one of the solution lines, a second control valve that selectively couples the second recirculation line to the first recirculation line, a third control valve that selectively couples the third recirculation line to the first recirculation line, and a fourth control valve that selectively couples at least one of the air lines to the first recirculation line; and wherein the controller is configured to,
during the primary portion of the spray cycle, close the fourth control valve such that the air circuit is isolated from the recirculation arrangement,
during a first part of the air pressure recirculation portion of the spray cycle, close the first and third control valves and open the second and fourth control valves such that any of the solution in the second recirculation line is forced into the solution tank by the air pressure from the air source, and
during a second part of the air pressure recirculation portion of the spray cycle, close the first and second control valves and open the third and fourth control valves such that any of the solution in the third recirculation line is forced into the solution tank by the air pressure from the air source.

11. An agricultural sprayer system having a chassis supporting a solution tank and a boom assembly mounting spray nozzles, the sprayer system comprising:

a solution circuit including solution lines and a fluid pump coupled to the solution tank to pump a solution from the solution tank through the solution lines to the spray nozzles, wherein the solution circuit further includes a recirculation arrangement with recirculation lines fluidly coupled to at least one of the solution lines downstream of the fluid pump and extending to the solution tank such that a portion of the solution from the solution lines is selectively recirculated back into the solution tank;

an air circuit including air lines and a source of compressed air to selectively introduce air pressure into the solution circuit, wherein the air circuit is configured to selectively introduce air pressure into the recirculation arrangement via at least one control valve; and a control system including a controller operatively coupled to the at least one control valve configured to control flow of the solution and the compressed air through the solution lines;

wherein the controller is configured to perform a spray cycle in which, during a primary portion of the spray cycle, the at least one control valve is controlled to isolate the air circuit from the solution circuit and the recirculation arrangement so that the solution is pumped by the fluid pump from the solution tank to the spray nozzles, and in which, during an air pressure application portion of the spray cycle, the at least one control valve is controlled so that the solution in the solution lines is forced through at least a portion of the solution circuit by the compressed air from the air source, including, during an air pressure recirculation portion of the spray cycle, the at least one control valve is controlled so that the solution in at least one of the recirculation lines is forced into the solution tank with the compressed air from the air source;

wherein the air lines include at least one first air line extending between the air source and at least one of the solution lines at a first position of the solution circuit at the solution pump or upstream of the solution pump and at least one second air line extending between the air source and at least one of the recirculation lines; and wherein the at least one control valve includes at least one first control valve selectively fluidly coupling the at least one first air line to the at least one of the solution lines at the first position and at least one second control valve selectively fluidly coupling the second air line to the at least one of the recirculation lines.

12. The agricultural sprayer system of claim 10, wherein the controller is configured to:

during the primary portion of the spray cycle, close the at least one first control valve such that the air circuit is isolated from the solution circuit and close the at least one second control valve such that the air circuit is isolated from the recirculation arrangement;

during the air pressure application portion of the spray cycle, close the at least one second control valve and open the at least one first control valve such that the solution in the solution lines is forced through at least a portion of the solution circuit by the compressed air from the air source; and during the air pressure recirculation portion of the spray cycle, close the at least one first control valve and open the at least one second control valve such that the solution in at least one of the recirculation lines is forced into the solution tank by the compressed air from the air source.

13. The agricultural sprayer system of claim 12, wherein the controller is configured to terminate the primary portion of the spray cycle and initiate the air pressure recirculation portion of the spray cycle when the solution in the solution tank reaches a first predetermined level, and wherein the controller is configured to terminate the air pressure recirculation portion of the spray cycle and initiate the air pressure application portion of the spray cycle when the solution tank is substantially empty.

14. A method for operating an agricultural sprayer system having a chassis supporting a solution tank and a boom assembly mounting spray nozzles, the method comprising:

applying a solution through the spray nozzles by pumping the solution from a solution tank through solution lines of a solution circuit with a solution pump to the spray nozzles during a primary portion of a spray cycle;

recirculating, during the primary portion of a spray cycle, a portion of the solution from the solution lines downstream of the solution pump, through recirculation lines of a recirculation arrangement, back into the solution tank; and forcing at least part of the portion of the solution in at least one of the recirculation lines back into the solution tank by introducing a first air pressure from an air source of an air circuit into the recirculation lines during an air pressure recirculation portion of the spray cycle;

wherein the applying, recirculating and forcing steps are controlled by a control system including a controller operatively coupled to at least one control valve configured to control flow of the solution and the compressed air through the solution lines and the recirculation lines; and wherein, during the primary portion of the spray cycle, the at least one control valve is controlled to isolate the air circuit from the solution circuit and the recirculation arrangement, and, during an air pressure recirculation portion of the spray cycle, the at least one control valve is controlled so that the first air pressure is introduced into the recirculation lines and the solution tank while the solution is pumped by the fluid pump from the solution tank to the spray nozzles.

15. The method of claim 14, further comprising forcing the solution in the solution lines out of the spray nozzles by introducing a second air pressure from the air source of the air circuit into the solution lines at the solution pump or upstream of the solution pump during an air pressure application portion of the spray cycle.

16. The method of claim 15, further comprising isolating the air circuit from the solution circuit during the primary portion of the spray cycle.

17. The method of claim 15, further comprising:

rinsing the solution from the solution lines with rinsate from a rinse arrangement by directing the rinsate through rinse lines into the solution circuit during a primary portion of a rinse cycle; and forcing at least a portion of the rinsate in the solution lines back into the solution tank by introducing a third air pressure from the air source of the air circuit.

18. The method of claim 17, further comprising commanding control valves coupling together the solution circuit, the air circuit, the recirculation arrangement, and the rinse arrangement such that the air pressure recirculation portion of the spray cycle occurs immediately after the primary portion of the spray cycle, air pressure application portion of the spray cycle occurs immediately after the air pressure recirculation portion of the spray cycle, the primary portion of the rinse cycle occurs immediately after the air pressure application portion of the spray cycle, and the air pressure portion of the rinse cycle occurs immediately after the primary portion of the rinse cycle.

* * * * *